Sept. 8, 1970  F. E. COLGAN  3,527,411
HIGH OUTPUT MIST PRODUCING UNIT
Filed March 5, 1968  2 Sheets-Sheet 1
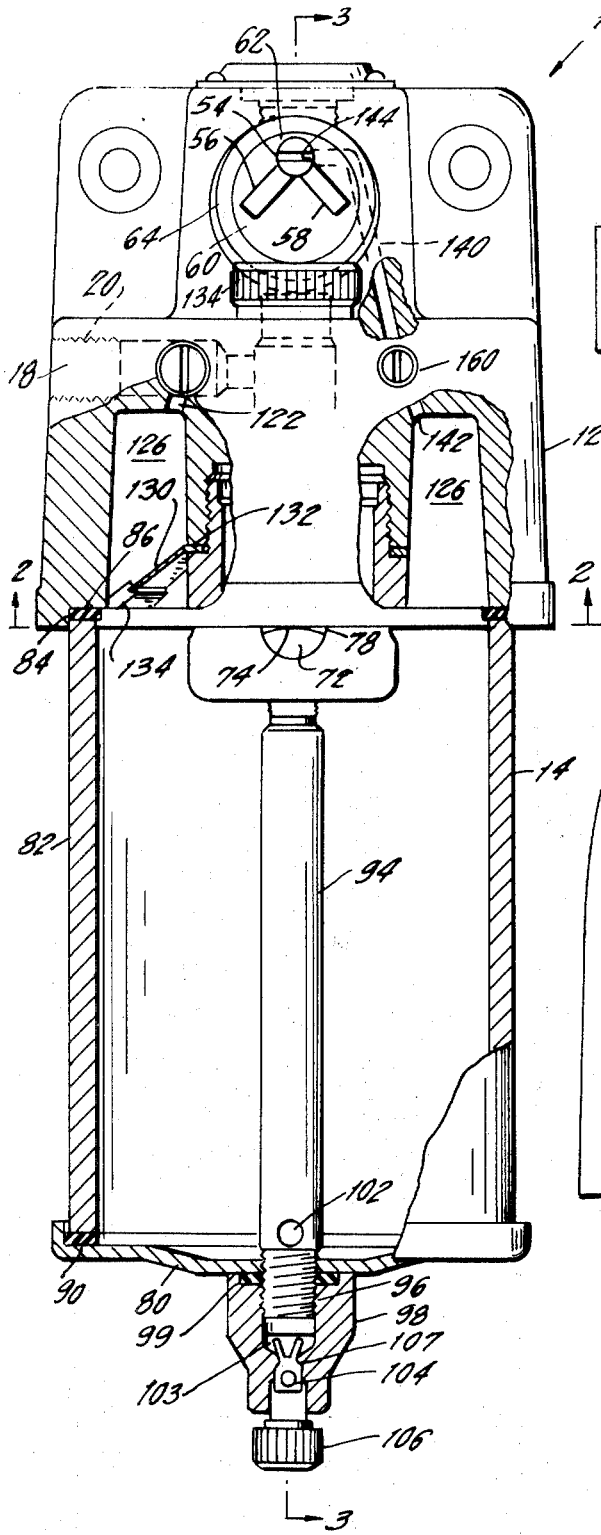
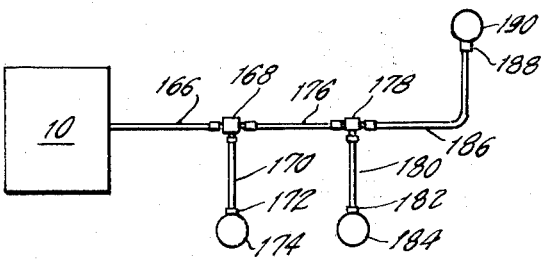
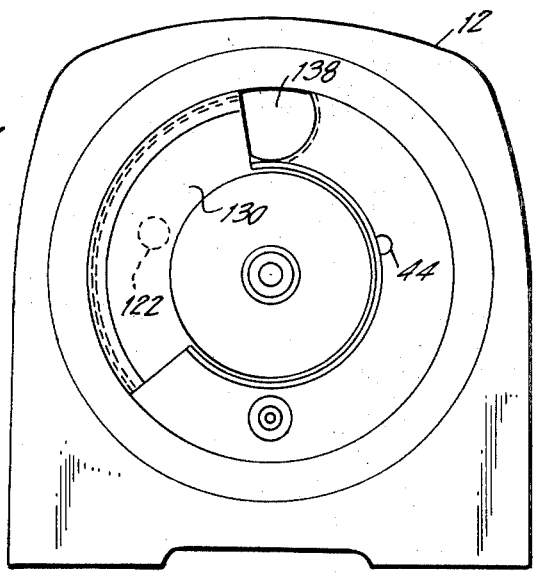
INVENTOR.
FRANCIS E. COLGAN
BY
OSTROLENK, FABER, GERB & SOFFEN
ATTORNEYS.

Sept. 8, 1970   F. E. COLGAN   3,527,411
HIGH OUTPUT MIST PRODUCING UNIT
Filed March 5, 1968   2 Sheets-Sheet 2
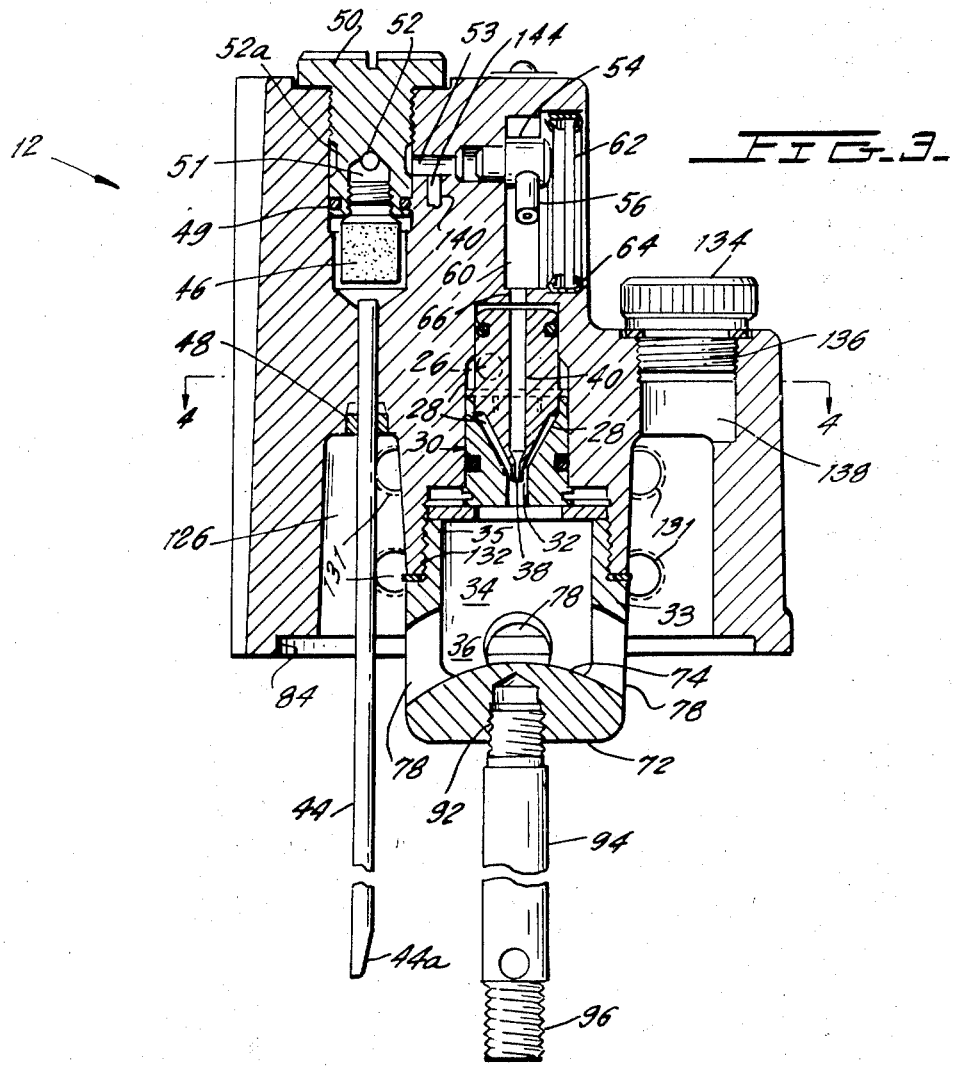
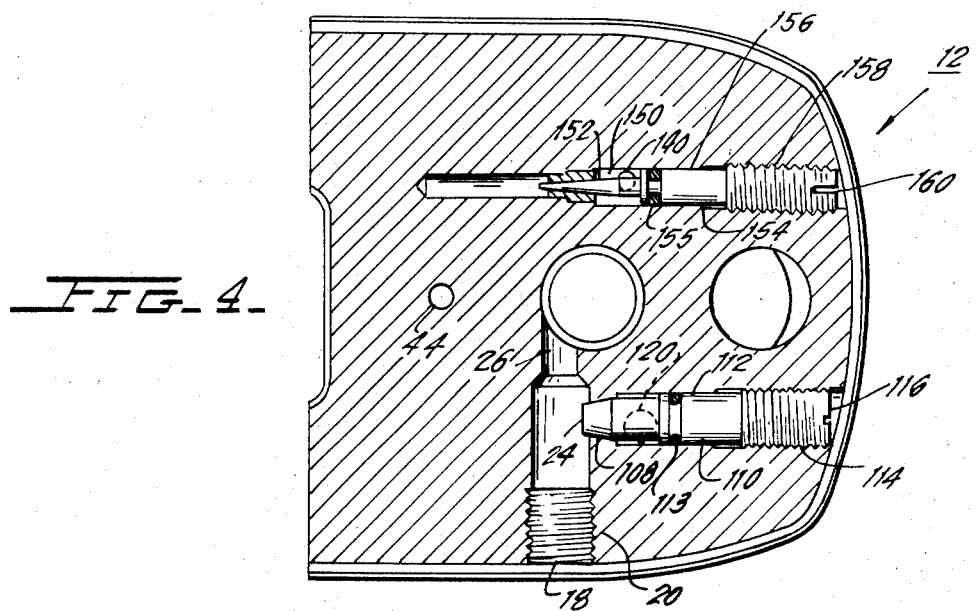

United States Patent Office 3,527,411
Patented Sept. 8, 1970

3,527,411
HIGH OUTPUT MIST PRODUCING UNIT
Francis E. Colgan, Midland Park, N.J., assignor to Auto Research Corporation, Boonton, N.J., a corporation of Delaware
Filed Mar. 5, 1968, Ser. No. 710,495
Int. Cl. A61m *11/06*
U.S. Cl. 239—338
6 Claims

ABSTRACT OF THE DISCLOSURE

Liquid is forced from a reservoir through a nozzle that mixes it with air; and the liquid breaks up into droplets that become suspended in air in mist form; the mist moves directly into an annular chamber surrounding the outlet of the nozzle; an extra air supply is passed through the chamber in the vicinity of the nozzle; the extra air picks up additional mist particles which would otherwise settle out, thereby increasing the mist output capacity of the mist producing unit without having to unduly increase the size of the unit, in addition, the extra air supply increases the air pressure around the mist nozzle outlet improving nozzle efficiency.

---

The present invention relates to mist prodcing units and, more particularly, to a mist producing unit which efficiently produces an increased volume of mist by employing an extra air supply.

In some machinery installations, particular bearings and points must be supplied with lubricant which is in mist form, that is, with the lubricant broken up into droplets suspended in air, rather than in liquid form. These bearings or points may be inaccessible to liquid lubricant that is dripped or sprayed on them or they may be shaped so that liquid lubricant would coat them non-uniformly. In order for them to be lubricated properly, they must be exposed to lubricant in mist form which surrounds the particular bearing or point. If necessary, means may be provided which uniformly condenses the mist lubricant onto the bearing or point.

Mist is also used to cool bearings, points or surfaces. The liquid in such mist may be water, lubricant or other spray cooling or lubricating item.

Liquid is placed in mist form by any of a number of known means. For example, a nozzle may be provided having a central passageway through which liquid passes and an annular surrounding passageway through which air under pressure is pumped. As the air exits from the nozzle, it draws out the liquid by the Venturi effect and breaks up the liquid into droplets of mist. The mist droplets are sufficiently small to be carried by and suspended in the air. Some droplets formed are too large to become suspended in the air. They are blown against a collector where they coalesce and settle.

For a nozzle of particular design and dimensions, a predetermined maximum volume of air and of liquid per unit time can pass through the nozzle to create mist. Once the air passing through the nozzle becomes saturated with droplets of liquid, additional droplets are unable to become suspended in air. They strike each other and coalesce into large droplets and are blown against the collector where they settle. If a greater volume of air per unit time contacts the droplets immediately after they are broken up by passing through the nozzle, then it requires a greater volume of droplets to saturate the air and a greater volume of usable mist is formed per unit time. Accordingly it is desirable to increase the air flow in the vicinity of the mist producing nozzle to increase the volume of usable mist produced by a particular mist producing unit in a predetermined period.

One manner of increasing air flow is to increase the size of the nozzle. But, a larger nozzle requires a larger size mist producing unit. A larger nozzle is expelling more air at greater velocity. This creates turbulence at the nozzle exit. Without the larger mist producing unit body, the mist droplets will be too confined, will be blown together and will coalesce.

An alternate manner of increasing air flow is to place the air passing through the nozzle under greater pressure, which increases the velocity of air flow. Again, the greater velocity air flow creates more turbulence and for a mist producing unit with this turbulence to operate efficiently and produce maximum mist, it must be made larger inside.

It is desirable to make a mist producing unit as small as possible, which also reduces its weight, expense of manufacture and difficulty of installation. To maximize air flow without increasing turbulence, an extra air supply, separate from the supply passing through the nozzle, mixes with the mist immediately after it is formed. This reduces the droplet concentration in the air and causes more mist to be produced per unit time with a nozzle of predetermined size than is possible with other mist producing units.

In the present invention, the nozzle expels air and liquid, which form mist on mixing, toward a collector which collects the liquid droplets that cannot become suspended in air, The nozzle has a shielding device surrounding it to prevent the additional air being supplied from blowing across the nozzle exit and preventing mist formation. The mist flows past the end of the shielding device and into an annular chamber surrounding the shielding device. An air supply is directed into the annular chamber, and by appropriate baffling the air supply is directed annularly around the exterior of the shielding device. The newly formed mist moves into the additional air supply before the mist particles have a chance to coalesce and settle. A greater volume of mist per unit time is produced.

The annular chamber has outlets leading to metering or apportioning units adjacent each of the bearings, points or surfaces to be sprayed. There is a pressure drop between the annular chamber and the outlets from the meter units. Due to the pressure drop, the mist passes out of the annular chamber through a number of outlet conduits and is carried to the bearings and points to be sprayed.

A mist producing nozzle operates most efficiently when the chamber into which the mist passes from the nozzle is at an air pressure which is at a predetermined ratio to the input pressure of the air moving into the nozzle. For example, for optimum mist production for a typical mist producing nozzle, the air pressure at the outlet of the nozzle should be one half the air pressure at the nozzle input.

As was noted just above, the mist in the annular chamber moves through the mist metering or apportioning units. To properly apportion mist flow, these units each have a flow restriction means therein. Necessarily in restriction flow, the metering units will exert a back pressure through the conduits leading to the metering units, to the annular chamber and into the chamber formed by the shielding device around the nozzle outlet. The air pressure in the vicinity of the nozzle outlet varies in proportion to the back pressure exerted by the metering units and the outlet conduits leading to the metering units. The outlet conduits are of sufficient diameter so that their effect upon the air pressure at the nozzle outlet is negligible. Therefore, only the metering units have a noticeable effect upon the back pressure.

It would be possible to choose and arrange the metering units so that their combined back pressure in the system would be the precise pressure that should be present at the nozzle outlet. As a practical matter, however, this system is unworkable. Mist producing units of a particular size must be uniformly manufactured. Each installation for a mist producing unit will differ in some respect, e.g., in the length of conduits leading to the metering units, in the number of metering units, in the flow capacities of the various metering units, and so forth. Therefore, it is very difficult to design a mist producing unit which when it is mounted in a system will have a uniform predictable back pressure in the vicinity of the outlet of the nozzle. As a result, it is very difficult to obtain the necessary ratio between the input pressure to the nozzle and the pressure in the vicinity of the nozzle outlet by providing metering units which are adjusted and chosen to provide the necessary back pressure.

One other way of placing the input pressure to the nozzle and the pressure in the vicinity of the nozzle outlet in proper ratio is the method used in the present invention. A separate air pressure source is provided which increases the air pressure in the chamber in the vicinity of the output of the nozzle until this pressure is in proper ratio to the input pressure at the maximum volume flow per unit time which the nozzle is capable of accepting to produce mist without undue turbulence in the mist producing unit. The extra air pressure source is then adjusted so that the combined back pressure from the metering units and from the distribution system leading thereto, plus the pressure from the extra air pressure source and from the air leaving the nozzle outlet is in proper ratio to the input pressure in the nozzle when the nozzle input pressure is set at the maximum level which the mist producing unit of predetermined size can tolerate without undue turbulence therein which would force the mist droplets to bump into each other and coalesce.

When the extra air supply is used, more mist can be provided with a mist producing unit of predetermined size than can be produced by a conventional unit of the same size. This is because a conventional unit of the same size would have too much internal air turbulence if air passed through it with sufficient rapidity to produce the amount of mist a unit of the design of the invention produces. Hence, a mist producing unit in accordance with the invention can be as efficient as a larger conventional unit.

In view of the foregoing, the mist producing unit designed in accordance with the present invention provides a number of benefits. First, the extra air supply picks up mist droplets before they have a chance to settle and carries them into the distribution system, whereby a maximum volume of mist is produced and a minimum of the mist produced is wasted. Also, the mist producing unit can be smaller than conventional units. Further, the extra air supply from a source of air under pressure communicates with the outlet from the mist producing nozzle, whereby the increase in pressure in the chamber into which the nozzle empties places that chamber at a pressure which is in the proper ratio to the input pressure to the nozzle, whereby the mist producing unit operates most efficiently to produce a maximum volume of lubricant in a period of time.

The volume of mist produced over time depends upon the volume of liquid lubricant passing to the mixing nozzle. One manner of controlling the rate of this flow is to put a blocking element, such as an adjustable needle valve in the path through which the liquid passes from a storage reservoir to the nozzle. The mist producing unit of the invention can be adapted with a novel means for controlling the liquid flow. The mist creating mechanism draws liquid through a conduit from a reservoir that is sealed both liquid and air tight. The mechanism is so positioned that the air exiting from both the nozzle and the extra air supply outlet passes into the space above the pool of liquid in the reservoir. Because of the back pressure and resistance to flow caused by the flow restriction metering units, this elevates the air pressure within the reservoir, thereby pushing liquid into the conduit leading to the nozzle. At the same time, the air exiting from the nozzle exerts a suction on the liquid in the conduit that pulls the liquid out the nozzle. A bypass conduit connecting the air space in the reservoir with the liquid conducting upstream of the entrance to the liquid conducting conduit and downstream of the nozzle will cause the nozzle suction to draw not only liquid through the nozzle, but also air under pressure from the reservoir. This reduces the flow of liquid volume per unit time to the nozzle and reduces mist volume production. To vary the effect upon liquid flow volume of the bypass conduit, an adjustable needle valve is inserted in this conduit. The more this valve blocks the conduit, the greater the liquid flow rate and the mist production rate, and vice versa.

The above general description applies to any mist producing unit. The liquid being converted into mist may be any liquid. The mist may be used for any purposes where mist is required, including lubrication, spray cooling, et al. The preferred use of the present invention is in conjunction with lubricant mist producing units.

Accordingly, the primary object of the present invention is to provide a high output mist generating unit which maximizes the volume of mist produced per unit time by a unit of predetermined size.

It is another object of the present invention to provide such a unit which minimizes the amount of liquid that first passes into mist form and then coalesces and condenses without passing as mist into the mist distributing system.

It is a further object of the present invention to increase the mist producing efficiency of the mist producing nozzle in a mist producing unit.

It is another object of the present invention to provide such a unit that will be smaller in size than conventional units with the same mist volume per unit time production capacity.

It is a further object of the present invention to provide means for controlling the mist production volume of a mist producing unit.

These and other objects of the present invention will become apparent when the following detailed description of the invention is read. The invention is described in conjunction with a mist producing lubricator for producing and distributing lubricant in mist form. Other materials may also be dispensed with a device designed in accordance with the invention.

FIG. 1 is an elevation, partly in cross section, showing a lubricant mist producing unit designed in accordance with the teachings of the invention;

FIG. 2 is a cross sectional plan view along the line and in the direction of 2—2 of FIG. 1;

FIG. 3 is a cross section through the upper portion of the mist lubricator shown in FIG. 1, as viewed from the left of FIG. 1, showing the operative elements of the lubricator;

FIG. 4 is a cross sectional plan view along the line and in the direction 4—4 of FIG. 3; and FIG. 5 schematically illustrates a system making use of the lubricator of the present invention.

Referring to FIG. 1, the lubricant mist producing unit 10 designed in accordance with the present invention is comprised of an upper section 12, shown in greater detail in FIG. 3, which is formed of a molded block of material, such as metal, and having a plurality of bores and chambers provided therein, as described hereinbelow. Depending from this upper portion is a reservoir 14 for containing liquid lubricant to be pumped by the lubricator.

The lubricant exits from the lubricator in mist form because air is mixed with the liquid lubricant. Turning to FIG. 4, air under pressure is supplied through inlet 18 which has a screw threaded circumference or other means for receiving a coupling connection to the source of air pressure. A standard air pump or a standard shop air supply may be connected to the air inlet 18. The air is pumped past branch conduit 24, which will be discussed below, through conduit 26 and into the annular chamber 28 of the nozzle 30.

Referring to FIG. 3, nozzle 30 tapers toward its exit 32, 38 and the chamber 28 similarly tapers and is of decreasing thickness toward the exit 32. The air exits from the nozzle 30 through air outlet 32 where it is mixed with the liquid lubricant, in a manner to be described to form lubricant mist in the chamber 34.

The air exiting through outlet 32, creates a Venturi effect by causing suction at the outlet 38 of the central chamber 40 of the nozzle. This draws any material in or above central chamber 40 of the nozzle through said outlet.

The air pressure into nozzle 30 is set at the maximum level for permitting mist to be formed in chamber 34 without undue turbulence being created which would cause the mist droplets to strike each other and coalesce. The pressure in chamber 34 in the vicinity of nozzle exit 32, 38 should be at a fixed ratio, e.g. 1:2, to the nozzle input pressure. Pressure in chamber 34 will only be atmospheric pressure unless some means increases this pressure. The metering units to be described, which apportion lubricant mist flow to various bearings and points to be lubricated, restrict free flow mist and exert a back pressure which increases the pressure in chamber 34. To further increase this pressure, an extra air supply communicates, in a manner to be described, with chamber 34 to bring the pressure therein up to the required level.

As was noted above, there is lubricant in the reservoir 14. Due to the suction at the nozzle outlet 38, lubricant is sucked out of reservoir 14 through inlet 44a of pipe 44. Pipe 44 passes through hereinafter described annular chamber 126 and through sealing gasket 48 which seals the aforementioned chamber at the point where pipe 44 exits from it.

Pipe 44 leads to filter 46 which may be any standard filter known in the art, including but not limited to a felt pad, wire mesh, a wire wool screen, a porous sintered metal disc or other porous element, and which filters impurities and dirt from the lubricant without halting its flow. Screw 50 is above filter 46 and is removable to permit access to filter 46 when the filter is to be serviced or replaced.

O-ring 49 surrounds screw 50 and prevents lubricant from leaking past the sides of filter 46. All lubricant passes through filter 46 into chamber 51.

From chamber 51, lubricant exits through conduit 52 into annular chamber 52a around screw 50, and from there the lubricant passes into conduit 53 which leads to junction 54 which has drip faucets 56 and 58 (FIG. 1) thereto connected. Referring to FIGS. 1 and 3, lubricant passing through faucets 56, 58 drips into the chamber 60. Chamber 60 is enclosed on all sides but one by the solid material of which the upper portion 12 of the lubricator is comprised. On its outward facing side, chamber 60 is enclosed by a transparent window 62, comprised of glass or clear corrosion-resistant plastic, which is secured liquid tight around its periphery by a frame 64, which is in turn sealed liquid tight with the body portion 12 of the lubricator. Through window 62, the drops falling from faucets 56, 58 may be observed. For an example of a faucet and window combination, see U.S. Pat. No. 3,076,526, entitled "Lubrication", issued Feb. 5, 1963 to Thomas R. Thomas, and assigned to the assignee hereof. If the drops are falling too fast, this may be reduced by reducing the flow of liquid lubricant up pipe 44; and if the drops are falling too slowly, the flow of liquid lubricant may be increased. The liquid flow rate adjustment is accomplished by means to be described. By observing that lubricant is properly dripping from nozzles 56, 58, and observer will know that the lubricator is properly operating. If the nozzles 56, 58 cease to drip, then an observer would know that the lubricator should be checked for malfunction.

The liquid lubricant dripping through chamber 60 is sucked by the air flow into the nozzle liquid inlet 66, through the nozzle chamber 40, and out nozzle liquid inlet 38. When the outrushing air and liquid lubricant mix, the liquid lubricant is broken up into droplets, many of which are of minute size. The smaller droplets are light enough to become suspended and to float in the air exiting from air outlet 32. The nozzle outlet 32, 38 has a cylindrical shield 33 around it which extends a short distance away from the nozzle in the direction in which air is blown out of nozzle 30. The mist must pass the end of shield 33. Shield 33 is provided to protect the exit of nozzle 30 from crosswinds of air from an extra air supply, to be described. The crosswinds would deflect the air exiting from exit 32 and might thereby disturb the suction on chamber 40; and they might blow the newly formed lubricant droplets into each other just after they were formed near nozzle liquid outlet 38 and before they had the opportunity to disperse in the air blowing out of air outlet 32 and circulating within the confines of shield 33. Shield 33 should be as short as possible to minimize the distance the droplets formed at nozzle 30 must travel before they are picked up by the air flowing through chamber 126, as is described below. In addition, the exterior of shield 33 serves as one side of the annular chamber 126, to be described below, to cooperate in the directing of air coming from an additional air supply to be described below, through the annular chamber.

Shield 33 is illustrated as being cylindrical with a circular cross section. However, the particular cross-sectional shape of the shield is not critical so long as it will perform the desired functions described herein. Shield 33 has a narrowed exterior diameter upper section 35 which is threaded on its exterior to matingly engage a threaded aperture in upper lubricator section 12.

Connecting panels 36 on shield 33 join it to element 72. Element 72 has a dual function. First, a number of the droplets formed as the air and liquid lubricant mix are too heavy to float in or be supported by the air in chamber 34. They fall or are blown by the air rushing out of air exit 32 against the surface 74 of element 72. The surface 74 is dome shaped so that wherever these droplets settle they roll downward and outward. Between adjacent panels 36 are located openings 78 which also serve a dual function. Only one of these is now described. Surface 74 extends through each opening 78 and comprises the base thereof. The panels 36 between adjacent openings 78 are so curved as to cause liquid lubricant rolling toward the edge of surface 74 to pass through the openings 78. Lubricant in liquid form rolling off the edges of surface 74 settles back into the pool of lubricant within reservoir 14.

Element 72 may perform a second function, holding the reservoir 14 in place. The reservoir 14 is formed as an open top container. Cap 80 forms the base of reservoir 14 and also supports cylindrical wall 82. The upper edge of wall 82 fits into an annular notch 84 on the bottom of lubricator portion 12. A resilient annular gasket 86 or other sealing means is provided for affording an air tight seal thereby preventing leakage of air and mist. Cap 80 is pressed by a means to be described against an annular gasket 90. This seals base cap 80 against the lower end of chamber wall 82 for providing an air and liquid tight seal to completely enclose the reservoir 14.

Element 72 has a threaded aperture 92 therein for receiving the matingly threaded first end of reservoir support post 94. Post 94 is threaded at 96 at its other end for receiving a cap securing nut 98. After post 94 has been inserted in element 72, and reservoir 14 and base plate 80 have been positioned, the threaded cap nut 98 is screwed over the threaded end 96 of post 94 which presses on cap 80. The reservoir 14 is sealed closed around post 94 by gasket 99.

Post 94 has an opening 102 at its base which is connected to an outlet chamber 103. This permits draining of the reservoir and removal of any impurities which have settled in the pool of lubricant within the reservoir. Exit port 104 communicates with chamber 103 and is secured to screw cap 106 which can be rotated to rotate the port element 107 to open or close port 104.

The openings 78 are at the outward end of shield 34. Herein is found the second function of openings 78. They are large enough in size and panels 36 between adjacent openings 78 are correspondingly small enough that lubricant mist floating within chamber 34 drifts and is blown by the air continually exiting from nozzle exit 32 through openings 78.

As discussed above, the present invention makes use of an extra air supply which both picks up mist droplets before they coalesce and settle and increases the air pressure in the reservoir to place this pressure at a proper ratio with respect to the input pressure passing through conduit 26 to the nozzle inlet. Turning to FIG. 4, air entering inlet 18 passes not only through conduit 26 but also enters conduit 24, which is the start of an extra air supply. In conduit 24, the air strikes the tapered end 108 of a needle valve 110. Valve 110 has a forward exterior surface 112 which slidingly engages the walls of the bore within which the valve is positioned in an airtight fashion. Airtight engagement is enhanced by O-ring 113. The rearward end 114 of the valve 110 is threaded to matingly engage a threaded portion of the bore within which the needle valve is positioned.

Valve 110 has a notched head 116 which may be rotated by, for example, a screw driver to move the needle valve in and out of its bore. When the needle valve is moved to be fully inserted, it covers the inlet opening 120. When the needle valve is withdrawn, it exposes opening 120 to the air moving into conduit 24. Adjustment of the needle valve to intermediate positions between the two extremes just described apportions a greater or smaller part of the air passing through the inlet 18 to the opening 120, as opposed to the conduit 26. The present invention has been illustrated using a small air supply that is divided between two conduits. It is within the contemplation of the invention to cause air to flow along two pathways by any means, e.g. providing two air supplies.

Turning to FIG. 1, the opening 120 of the extra air supply is connected by a conduit 122 with the annular chamber 126, which is described in greater detail below.

Conduit 122 directs the air exiting therefrom in substantially the same direction as the direction of flow out of nozzle 30. Returning to FIG. 3, chamber 126 is annular and is enclosed by lubricator section 12 on all but its bottom side, the side communicating with reservoir 14. Shield 33 forms the interior wall of chamber 126. The air passing under pressure through conduit 122 into the upper side of chamber 126 would normally flow down into the reservoir 14 and against the surface of the lubricant therein.

Referring to FIGS. 1 and 2, an arcuate baffle plate 130 is positioned to substantially cover the entire open bottom of the chamber 126 over an arcuate portion of the bottom of said chamber. The baffle plate is centered beneath the outlet from conduit 122. On its interior edge the baffle plate is supported by its tab 132 that is seated between a shoulder of lubricator portion 12 and a shoulder on the exterior of shield 33. On its exterior edge, baffle plate 130 may reach to a support 134 or only part way across chamber 126, so long as it extends across chamber 126 far enough to redirect the flow of the extra air supply as will be described. The inrushing air strikes the surface of the baffle plate 130 and is redirected transversely to its downward direction. It is desirable to have the redirected air move in one direction. Thus, the baffle plate, in addition to being inclined downward toward its outer edge, is also inclined from one arcuate end to the opposite arcuate end thereof. The continuing flow of air through conduit 122 forces the redirected air to flow in a continuous transverse or sideways stream.

Baffle plate 130 does not extend completely around the exterior of shield 33. The redirected airflow therefore sweeps around shield 33 at a height lower than that of baffle 130 whereby the air sweeps past the openings 78, which are largely below baffle 130, to carry away the mist.

Considering FIGS. 1 and 3, the redirected air passes through the annular chamber 126 and comes into contact with the openings 78. As mist is moved, by air exiting from exit 32, from within chamber 34, it is mixed with the air moving through chamber 126. The concentration of liquid droplets in the mist immediately decreases due to the increase in the volume of air supporting the droplets.

A given volume of air can only support a predetermined volume of lubricant droplets. Once the air is saturated, additional droplets, no matter how fine or minute, strike each other, coalesce and condense out. Increase the volume of air, and the volume of lubricant droplets that can be supported also increases. Therefore, the use of annular chamber 126 to provide an extra air supply for picking up the lubricant mist droplets immediately after they are formed in and pass from within shield 33 permits a lubricant mist forming unit, with a nozzle that can only produce a predetermined amount of mist per unit time, to produce a greater volume of usable mist within that predetermined period. In addition, the extra air supply permits a lubricator adapted with it to be made smaller in size without any turbulence problems that would occur in a normal lubricator of that size producing as much mist.

The longer the distance the mist produced by nozzle 30 must travel before contacting the extra air supply, the greater the volume of lubricant droplets that will coalesce and settle out. Thus, it is preferable as is done in the present invention, to bring the extra air supply as close to the nozzle exit as possible by making shield 33 short.

As has been discussed, the extra air passing out of conduit 122 increases the pressure in chamber 126. Chamber 126 opens into reservoir 14 above the pool of lubricant therein. Reservoir 14 is sealed and the increased pressure cannot escape. The chambers 126, 34 and reservoir 14 together form an airtight sealed container with all these elements being in communication with the container. The metering units, to be described, restrict the exit of pressure from the system. As the pressure in chamber 126 and in reservoir 14 increases, since chamber 34 communicates with them, the pressure therein adjacent the outlet of nozzle also increases, until the optimum pressure level, previously described, is reached. The mist laden air in annular chamber 126 passes through a plurality of outlet ports 131 which are spaced about the chamber 126. The outlet ports 131 connect with main distribution line 166 (FIG. 5) which leads to the mist distributing system. The distributing system schematically illustrated in FIG. 5 is exemplary of the infinite variety of such systems. The mist passes from lubricator 10 through conduit 166 and through junction 168. Some of the lubricant mist passes through conduit 170, and through a metering unit 172 that apportions the volume of mist that passes through conduit 170, to lubricate the bearing 174. The bulk of the mist passes through junction 168 to conduit 176 and then to junction 178 where a portion of the lubricant mist passes down conduit 180 to metering unit 182. Metering unit 182 may be a mist condensation fitting which condenses the mist to a liquid form to lubricate the bearing 184. Mist passes through conduit 186 to metering unit 188 which apportions per unit time the volume of lubricant passing to bearing or point 190.

As mist or lubricant is forced out of metering units 172, 182 and 188, there is a pressure drop across each of them, which creates a pressure drop in distribution line 166. The reduced pressure in line 166 is sensed within annular chamber 126 and the lubricant mist in said chamber is drawn into line 166 and is drawn through the metering units by the pressure drop over the metering units.

Each of the metering units has a bore extending completely therethrough with a flow restriction means therein, e.g. a portion of the bore is narrowed. The restriction limits the rate of flow through the unit. In restricting flow, each metering unit exerts a back pressure which is transmitted through conduit 166 back into chamber 126. This back pressure, plus the pressure added to it by the inflowing extra air supply, elevates the pressure in chamber 34 to the required level for optimum operation of nozzle 30.

Referring to FIG. 3, reservoir filler cap 134 is provided which has a screw threaded exterior 136 that mates with a cooperatingly threaded aperture within the portion 12 of the lubricator. The filler cap communicates with an aperture 138 that leads to the chamber 126. Lubricant poured into conduit 138 falls into the reservoir 14. Other locations for the filler conduit and filler cap 134 may be chosen to permit lubricant to enter the reservoir 14.

There has just been described a novel lubricant mist producing lubricator for producing a greater volume of usable mist per unit time with a nozzle of predetermined mist producing capacity than the volume of mist that can be produced with prior art mist producing units. The lubricator can be smaller in size than a conventional lubricator for producing the same volume of mist since with the present invention, there is less air turbulence within the mist producing unit, whereby the mist particles produced will not be striking each other, coalescing and settling.

In the event that it is desired to vary the volume of liquid lubricant moving to the nozzle portion 40, valve means known in the art, such as an adjustable needle valve, may be placed anywhere along pipe 44 or conduit 53 and may be made adjustable, e.g. by being screw threaded with the screw being accessible from the exterior of the lubricator.

A preferred means for controlling the volume of liquid lubricant passing into the system is shown in FIGS. 1 and 4. As was noted above, the air passing out air outlet 32 of nozzle 30 creates a suction force which pulls lubricant up pipe 44 and through connecting conduits out liquid outlet 38. In addition, chamber 126 has an open bottom which communicates with reservoir 14, and the air passing into said chamber from conduit 122 increases the air pressure within the airtight reservoir 14 because of the back pressure caused by the metering units. This pressure increase cooperates with the escaping air from nozzle 32, which also increases the air pressure in reservoir 14, to press the liquid lubricant in reservoir 14 down, which, in turn, forces same up pipe 44.

The present lubricant mist production volume controller makes use of the knowledge that if the air pressure in reservoir 14 is connected to the liquid lubricant flow path downstream of the inlet 44a of pipe 44 and upstream of the nozzle 30, some of the air under pressure within reservoir 14 will be sucked along with lubricant into the lubricant flow conduit system 44, 46, 52, 52a, 53, 56, 58 by the suction exerted by air flow through nozzle 30. If the opening in the lubricant flow conduit system to the air under pressure within reservoir 14 becomes sufficiently enlarged, the suction force exerted by the air exiting through outlet 28 of the nozzle will only draw air out of reservoir 14 and no liquid lubricant will be pumped. As the width of the opening connecting the liquid lubricant flow system with the air under pressure in reservoir 14 is reduced, there is insufficient air being sucked out of reservoir 14 to satisfy the suction exerted by nozzle 30 and liquid lubricant will again flow out of reservoir 14 up pipe 44.

In FIG. 1, note the pipe 140 which opens at its end 142 into chamber 126, which is in communication with reservoir 14 and which is connected at its end 144 into lubricant flow conduit 53. Were pipe 140 unobstructed, the suction due to the passage of air through nozzle exit 32, plus the increase in pressure within reservoir 14 would drive the air under pressure within reservoir 14 up along pipe 140 and into conduit 53, there to pass down and through nozzle exit 38, whereby no liquid lubricant would pass through the faucets 56, 58 and out nozzle 30. Turning to FIG. 4, to preclude this possibility, a needle valve 150 is provided, having a tapered front end 152 for blocking pipe or conduit 140. Needle valve 150 has a stem 154 which engages the surface 156 of the wall around a bore through the body portion 12 of the lubricator. The engagement is airtight and O-ring 155 further ensures this. The valve has a screw threaded end 158 which mates with a cooperatingly threaded aperture within the body portion 12 of the lubricator. At the exterior end of the valve stem 154 is a notched head 160 which may be operated by a screw driver to rotate the valve stem, thereby to move tapered valve element 152 in or out of the path of flow of conduit 140. When valve 150 is moved inwardly, it blocks conduit 140, thereby eliminating the bypass of pressure out of reservoir 14, thereby increasing the quantity of liquid lubricant passing up pipe 44. Similarly, movement of valve element 152 out of the conduit 140 permits a greater pressure flow through conduit 140, thereby reducing the flow through pipe 44 and reducing the liquid flow out of nozzle 30.

The invention of a novel mist producing unit has been illustrated with a mist lubricator. However, any other liquid material may be used in conjunction with the invention and the invention may be used for other purposes besides lubrication, e.g. spray cooling.

There has just been described a mist producing unit which is enabled to provide a greater volume of lubricant mist per unit time with a nozzle having predetermined mist producing capacity than is possible with mist producing units of the prior art. This is accomplished by providing an additional air supply which sweeps past the mist just after it flows out of the mist creating nozzle, thereby decreasing the concentration of lubricant droplets within the mist. With such an apparatus, less space is needed within the mist producing unit for forming mist efficiently since the apparatus reduces the amount of air turbulence which would normally occur within a mist producing unit producing as much mist efficiently. As an additional feature, the present invention includes a pressure bypass which cycles some of the pressure in the reservoir that is caused by the outflow of air from the nozzle and the extra air supply back into the liquid suction line, thereby varying the rate of liquid flow up said line.

Although there has been described a preferred embodiment of this novel invention, many variations and modifications will now be apparent to those skilled in the art. Therefore, this invention is to be limited, not by the specific disclosure herein, but only by the appended claims.

What is claimed is:
1. In a mist producing unit,
 a nozzle for mixing air and liquid for forming mist, said nozzle having an inlet means into which liquid and air pass to enter said nozzle and an outlet means out of which liquid and air are forced in a first direction to mix and to form mist;
 a liquid conduit means connected to said inlet means for transmitting liquid from a reservoir to said nozzle;
 a first air supply conduit means connected to said inlet means for transmitting air under pressure from an air supply to said nozzle;
 a mist receiving and dispensing installation comprising at least one mist flow volume metering unit to be positioned to apportion flow volume to an item to be serviced with mist, and a conduit connecting said at least one metering unit with said exit means, whereby the restriction to flow caused by said at least one metering unit creates a back pressure in said conduit for operating upon said nozzle outlet means;

the improvement comprising, a second air supply means including a conduit means for transmitting air under pressure from an air supply and including means for directing the additional air into the vicinity of said nozzle outlet means thereby enabling the additional air to mix with the mist exiting from said nozzle outlet means which increases the available air for supporting mist droplets and increases the volume of mist produced by said unit without increasing the air turbulence within said unit so that said unit may be kept smaller in size;

an exit means for conducting the mist now mixed with additional air to a mist receiving installation;

an airtight container communicating with both said outlet means of said nozzle and said second air supply conduit means; said exit means communicating with said container;

said container including a reservoir for containing liquid to be converted to mist, whereby the increase in the air pressure within said containers due to air being expelled both by said outlet means of said nozzle and by said second air supply means, cooperating with the flow restriction effect of said metering units, increases the air pressure within said reservoir;

said liquid conduit means comprising a pipe means having an inlet extending into said reservoir for drawing liquid through said inlet and through said pipe means out from within said reservoir;

a pressure bypass conduit communicating between said container and said liquid conduit means at a position downstream of said inlet to said liquid conduit means and upstream of said nozzle inlet means, for transmitting pressure in said container into said liquid conduit means;

and valve means in said pressure bypass conduit for controlling the pressure transmitted by said bypass conduit.

2. In a mist producing unit, a nozzle for mixing air and liquid for forming mist; said nozzle having an inlet means into which liquid and air pass to enter said nozzle and an outlet means out of which liquid and air are forced in a first direction to mix and to form mist;

a liquid conduit means connected to said inlet means for transmitting liquid from a reservoir to said nozzle;

a first air supply conduit means connected to said inlet means for transmitting air under pressure from an air supply to said nozzle;

the improvement comprising, a second air supply means including a conduit means for transmitting air under pressure from an air supply and including means for directing the additional air into the vicinity of said nozzle outlet means thereby enabling the additional air to mix with the mist exiting from said nozzle outlet means which increases the available air for supporting mist droplets and increases the volume of mist produced by said unit without increasing the air turbulence within said unit so that said unit may be kept smaller in size;

an exit means for conducting the mist now mixed with additional air to a mist receiving installation;

a shielding device around the periphery of said nozzle outlet means of said nozzle for shielding said exit from an additional air supply; said shielding device extending a predetermined distance in said first direction so as not to interfere with the mixing of an additional air supply with the mist passing beyond said predetermined distance;

said second air supply means including means for directing the additional air around the exterior of said shielding device, thereby enabling the additional air to mix with the mist passing beyond said shielding device.

3. In the mist producing unit of claim 2, the improvement further comprising, said means for directing air including a chamber around said shielding device formed by the exterior of said shielding device and a wall spaced away from said shielding device; said second air supply conduit means having an outlet communicating with said chamber.

4. In the mist producing unit of claim 3, the improvement further comprising, said outlet of said second air supply means being aimed so as to direct the air exiting therefrom substantially in said first direction; a first air directing baffle within said chamber for redirecting the air from said outlet to pass around said shielding device and to pass through said chamber transversely to said first direction; said first baffle extending transversely of said first direction around a portion of said chamber.

5. In the mist producing unit of claim 4, a collector disposed and supported in spaced opposed relationship to said outlet means from said nozzle, in order that the liquid droplets which are not suspended in air may strike said collector and condense into liquid form.

6. In a mist producing unit, a nozzle for mixing air and liquid for forming mist; said nozzle having an inlet means into which liquid and air pass to enter said nozzle and an outlet means out of which liquid and air are forced in a first direction to mix and to form mist;

a liquid conduit means connected to said inlet means for transmitting liquid from a reservoir to said nozzle;

a first air supply conduit means connected to said inlet means for transmitting air under pressure from an air supply to said nozzle;

the improvement comprising, a second air supply means including a conduit means for transmitting air under pressure from an air supply and including means for directing the additional air into the vicinity of said nozzle outlet means thereby enabling the additional air to mix with the mist exiting from said nozzle outlet means which increases the available air to supporting mist droplets and increases the volume of mist produced by said unit without increasing the air turbulence within said unit so that said unit may be kept smaller in size;

an exit means for conducting the mist now mixed with additional air to a mist receiving installation;

a collector disposed and supported in spaced opposed relationship to said outlet means from said nozzle, in order that the liquid droplets which are not suspended in air may strike said collector and condense into liquid form.

References Cited

UNITED STATES PATENTS

| 2,778,619 | 1/1957 | Goodyer | 184—55 X |
| 2,840,417 | 6/1958 | Dorsak et al. | 239—338 X |
| 3,086,616 | 4/1963 | Thomas | 184—55 |

ALLEN N. KNOWLES, Primary Examiner

M. Y. MAR, Assistant Examiner

U.S. Cl. X.R.

184—55